United States Patent [19]

Wolf

[11] Patent Number: 5,959,023
[45] Date of Patent: Sep. 28, 1999

[54] MOISTURE-CROSSLINKING PU HOT-MELT ADHESIVES

[75] Inventor: Elmar Wolf, Recklinghausen, Germany

[73] Assignee: Huels Aktiengesellschaft, Marl, Germany

[21] Appl. No.: 08/908,701

[22] Filed: Aug. 8, 1997

[30] Foreign Application Priority Data

Aug. 8, 1996 [DE] Germany ............................ 196 31 993

[51] Int. Cl.$^6$ ................................ C08J 3/00; C08K 3/20; C08L 75/00; C08G 18/10
[52] U.S. Cl. ........................ 524/590; 156/325; 156/331.4; 156/331.7; 428/423.1; 524/589; 528/60; 528/61; 528/62; 528/73; 564/189
[58] Field of Search ............................. 564/189; 524/589, 524/590; 528/60, 61, 62, 73; 428/423.1; 156/325, 331.4, 331.7

[56] References Cited

U.S. PATENT DOCUMENTS

| | | | |
|---|---|---|---|
| 4,178,279 | 12/1979 | Uhrhan et al. | 260/45.8 N |
| 4,243,792 | 1/1981 | Short | 528/73 |
| 4,260,691 | 4/1981 | Rody et al. | 525/130 |

FOREIGN PATENT DOCUMENTS

| | | |
|---|---|---|
| 0 096 210 | 12/1983 | European Pat. Off. . |
| 0 475 003 | 3/1992 | European Pat. Off. . |
| 0 480 139 | 4/1992 | European Pat. Off. . |
| 26 36 143 | 5/1977 | Germany . |

*Primary Examiner*—Patrick D. Niland
*Attorney, Agent, or Firm*—Oblon, Spivak, McClelland, Maier & Neustadt, P.C.

[57] ABSTRACT

Moisture-crosslinking PU hot-melt adhesives produced by reacting an —NCO containing prepolymer and a sterically hindered polyamine which have a very high initial strength.

26 Claims, No Drawings

MOISTURE-CROSSLINKING PU HOT-MELT ADHESIVES

BACKGROUND OF THE INVENTION

1. Field of the Invention

The present invention relates to a moisture-crosslinking PU hot-melt adhesive prepared by reacting an isocyanate-containing prepolymer with a sterically hindered polyamine having an NH functionality $\geq 2$.

2. Discussion of the Background

Hot-melt adhesives are easy to manufacture and are useful in a wide variety of applications since they can be made without solvents and set rapidly without pot-life problems. These materials do have limitations on their use, however, because they are often only moderately stable. Hot-melt adhesives are thermoplastic systems and, therefore, the melting process is reversible. As the temperature rises, the bonded joint becomes more and more plastic until, finally, the liquid melt state is reached again. The chemical stability of hot-melt adhesives and their resistance to solvents, plasticizers, oils and chemicals is similar to other non-crosslinked resins and plastics. Resistance may be high in a particular medium, overall, however, the hot-melt adhesives can be expected to show greater swellability or even solubility as compared to crosslinked adhesives.

These fundamental weaknesses of thermoplastic hot-melt adhesives are largely overcome by the reactive polyurethane (PU) hot-melt adhesives. These materials are produced from moisture-curing polyurethane prepolymers, which were introduced into the market at the beginning of the 1980s. The PU hot-melt adhesives are initially meltable, like the conventional hot-melt adhesives, and set in accordance with the typical hot/cold mechanism. After the initial setting, these adhesives undergo irreversible crosslinking in the bonded joint within a period of a few days, as a result of chemical reaction of remaining —NCO groups with moisture. During this process, the originally thermoplastic film undergoes a transition to a thermoset state. In other words, the formerly thermoplastic hot-melt adhesive joint is now crosslinked and can no longer be melted. From the time of application to crosslinking there is a time period where the initial adhesion strength, i.e., the strength of the bonded materials directly after bonding, is relatively low. The length of this time period depends on the chemical composition of the adhesive and can range from several hours to several days.

In many applications, rapid setting of the hot-melt adhesive is necessary in order to further process the bonded articles and still maintain a short pot life. Accordingly, there have been many attempts to produce moisture-crosslinking PU hot-melt adhesives that have improved initial strength and a shorter setting time.

For example, EP-A 0 248 858 discloses that polyesters having a large proportion of aromatic dicarboxylic acid units improve the setting rate, but leads to products with a high melt viscosity, which hinders processing, and a flexibility in the fully cured state that is too low for many applications. The rapidly crystallizing polyesters disclosed in DE-A 38 27 224 suffer from many of the same disadvantages because the strong crystallization tendency leads to a perceptible change in volume during curing, which causes the adhesive film to peel from the substrate.

Accordingly, there remains a need for moisture-crosslinking hot-melt PU adhesives which have high initial adhesive strength and short setting time which overcome these disadvantages.

OBJECTS OF THE INVENTION

It is an object of the present invention to provide a moisture-crosslinking PU hot-melt adhesive which produces an adhesive bond having high initial strength.

SUMMARY OF THE INVENTION

These objects and others are accomplished with an adhesive composition obtained by reacting a prepolymer having terminal —NCO groups and an NCO content of 1 to 23% with a polyamine containing sterically hindered amino groups to produce a polymer containing urea linkages. The polyamine either (A) has at least two amino groups having the formula:

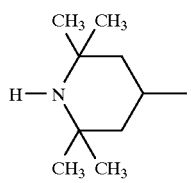

or (B) is a polymeric 2,2,4-trimethyldihydroquinoline of the formula:

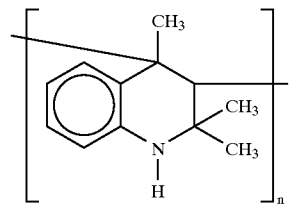

where n is an integer from 3 to 6.

A more complete appreciation of the invention and many of the attendant advantages thereof will be readily obtained as the same becomes better understood by reference to the following detailed description.

DETAILED DESCRIPTION OF THE INVENTION

The prepolymer is preferably the reaction product of a molecular enlargement reaction in which a diisocyanate is treated with a chain extender commonly used in isocyanate chemistry. A preferred chain extender is water or a polyol. The polyol preferably contains two or more —OH groups. Preferably, the polyol contains two or three hydroxyl groups. In this reaction, the chain extender is preferably used in amount such that the resulting prepolymer product contains, on average, at least two terminal —NCO groups per molecule. The prepolymer may also be a biuret derivative of a diisocyanate. The trimer derivative of a diisocyanate, i.e., an isocyanurate, may also be used as the prepolymer. The biuret or isocyanurate derivatives may be reacted with a chain extender in the same fashion as the diisocyanate to produce the prepolymer. The prepolymer preferably contains aliphatic, cycloaliphatic, (cyclo)aliphatic or aromatic isocyanate groups. The prepolymer preferably has an NCO content of 1 to 23%. This NCO content range includes all specific values and subranges in between, including 2, 5, 10, 15 and 20%. More than one prepolymer may be used to prepare the adhesive composition.

The diisocyanate used in preparing the prepolymer preferably has the formula:

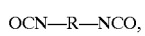

where R is a hydrocarbon radical.

Preferably, R is an aliphatic, cycloaliphatic, (cyclo) aliphatic, araliphatic or aromatic radical. The aliphatic radicals or fragments thereof may have any structure, such as linear branched or cyclic. In a particularly preferred embodiment, R is a $C_6$–$C_{14}$ hydrocarbon radical. Suitable diisocyanates are described in, for example, *Kirk-Othmer Encyclopedia of Chemical Technology*, Vol. 14, Fourth Edition, pp. 902–935, Houben Weyl, *Methoden der organischen Chemie* (Methods of Organic Chemistry), Vol. 14/2, pp. 61–70 and by W. Sietken in *Justus Liebigs Annalen der Chemie* 562, pp. 75–136, all of which are incorporated herein by reference in their entirety. Non-limiting examples of diisocyanates include 1,6-hexamethylene diisocyanate (HDI), 2-methylpentamethylene 1,5-diisocyanate, 2,2,4(2,2,4)-trimethyl-1,6-hexamethylene diisocyanate (TMDI), 1,12-dodecane diisocyanate, cyclohexane 1,3- and 1,4-diisocyanate, 3-isocyanatomethyl-3,5,5-trimethylcyclohexyl isocyanate (isophorone diisocyanate (IPDI)), 2,5- and 2,6-bis(isocyanatomethyl)bicyclo[2.2.1]-heptane, perhydro-2,4'- and/or -4,4'diphenylmethane diisocyanate, 2,4- and 2,6-hexahydrotolylene diisocyanate, 1,4-phenylene diisocyanate, 2,4- and 2,6-tolylene diisocyanate, and 4,4'-diisocyanato-diphenylmethane (MDI). The readily available diisocyanates hexamethylene diisocyanate, isophorone diisocyanate, tolylene diisocyanate and 4,4'-diisocyanato-diphenylmethane are particularly preferred. Mixtures of diisocyanates may be used. In this case, each R is individually selected.

Non-limiting examples of polyols which may be used to prepare the prepolymer include ethylene glycol, 1,2-propanediol, 1,3-propanediol, 2,2-dimethylpropane-1,3-diol, 1,4-butanediol, 1,6-hexanediol, 2,2,4(2,2,4)-trimethyl-1,6-hexamethylenediol, dodecanediol, 1,18-octadecanediol, diethylene glycol, triethylene glycol, trans- and cis-1,4-cyclohexanedimethanol, 1,4-cyclohexanediol, glycerol, 1,2,6-hexanetriol and trimethylolpropane. Mixtures of these polyols can be used. Preferably, the polyol is a polyesterpolyol. Particularly preferred polyesterpolyols have a mean molecular weight of 300 to 4000, more preferably 1000 to 3000. The polyesterpolyols with an OH functionality of 2–3 are prepared in a known manner by condensing the above-mentioned polyols with aliphatic and/or aromatic dicarboxylic acids or acid equivalents (such as anhydrides, acid halides and esters). Non-limiting examples of dicarboxylic acids or acid equivalents include adipic acid, sebacic acid, dodecanedioic acid, 2,2,4(2,4,4)-trimethyladipic acid, terephthalic acid, isophthalic and phthalic acid and/or phthalic anhydride. Other examples of polyols and polyesterpolyols which may be used are disclosed in U.S. Pat. No. 5,126,170, column 3 and U.S. Pat. No. 5,508,111, columns 1–3, both incorporated herein by reference.

In the chain extension reaction with $H_2O$, biuret-functional polyisocyanates are preferable formed exclusively. Their preparation is described in DE-A 23 08 015, 26 19 548 and 29 18 739, all incorporated herein by reference. The following is a preferred but non-limiting example for preparing these compounds. In this reaction, water is added in portions at about 80° C. to the diisocyanate, which is present in a large excess, and, after the addition of $H_2O$ is over, heating is continued at 80° C. until two NCO equivalents have reacted per mole of $H_2O$ employed. Thereafter, heating is continued at 140° C. until one further NCO equivalent has reacted. The unreacted diisocyanate is subsequently separated off from the reaction product by thin-film distillation at 120–160° C./0.1 mbar. The reaction product preferably has an NCO content of 16–23% and a monomer content of $\leq 0.5\%$. A preferred biuret compound has the formula:

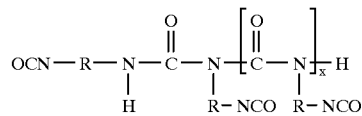

where x is 1, 2 or 3. In preparing these biuret derivatives, more than one diisocyanate may be used. Accordingly, each R may be the same or different, i.e., the R groups are independently selected.

The preparation of isocyanurates by trimerization of diisocyanates is described in DE-A 25 51 634, 26 44 684 and 29 16 201, all incorporated therein by reference. In this reaction, it is preferable to use a catalyst, such as a quaternary ammonium salts, as described in DE-A 29 16 201, incorporated herein by reference. For the batchwise preparation of isocyanurate-functional polyisocyanates, the following procedure is preferred. The catalyst is added to the diisocyanate which has been heated to 80° C. After about 3 minutes, the temperature rises to about 130° C. When the temperature maximum is reached the reaction is at an end. The conversion is regulated (at a constant initial temperature of 80° C.) by the concentration of the catalyst. Preferably, the catalyst concentration is chosen such that, under the stated reaction conditions, about 40% of the diisocyanate employed is reacted. A preferred amount of catalyst is 0.1 to 0.2%, based on the weight of diisocyanate. The unreacted diisocyanate is separated off by thin-film distillation at 120–180° C./0.1 mbar. The isocyanurate products have an NCO content of 16–23% and a monomer content of $\leq 0.5\%$. A preferred isocyanurate derivative has the formula:

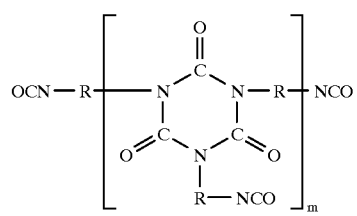

where m is 1, 2 or 3. In preparing these isocyanate derivatives, more than one diisocyanate may be used. Accordingly, each R may be the same or different, i.e., the R groups are independently selected.

The biuret- and/or isocyanurate-functional polyisocyanate may be reacted with the polyamine containing at least two sterically hindered amino groups without further reaction, to provide the adhesive. In some cases, however, it has been found expedient to subject these compounds to a molecular enlargement with a polyol, prior to the reaction with the polyamine. Here, the polyol is preferably a polyesterdiol having an average molecular weight of 400 to 2000, preferably 400 to 1000. In this reaction, the molar ratio of polyisocyanate to polyesterdiol is preferably 2:1.

The term "sterically hindered amino group" as used herein refers to a 2,2,6,6-tetramethylpiperidine group or a 2,2,4-trimethyldihydroquinoline moiety. As the sterically hindered polyamine, compounds that contain at least two 2,2,6,6-tetramethylpiperidine groups per mole may be used.

Preferably, the polyamine contains two or three 2,2,6,6-tetramethylpiperidine groups per mole. Such compounds may be obtained in a known manner by reacting the following piperidines:

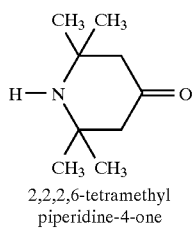
2,2,2,6-tetramethyl piperidine-4-one
(TAA)

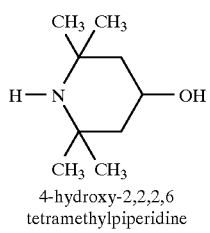
4-hydroxy-2,2,2,6 tetramethylpiperidine
(TAA-ol)

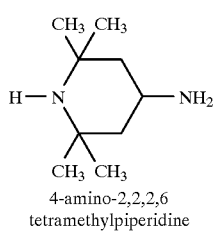
4-amino-2,2,2,6 tetramethylpiperidine
(TAD)

with compounds which contain at least two groups that are reactive toward the carbonyl, hydroxyl and amino groups.

Non-limiting examples of these polyamine products include:

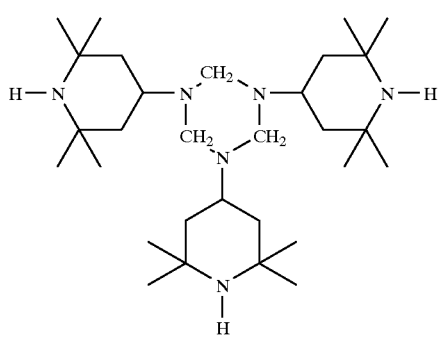
(a)

(b)

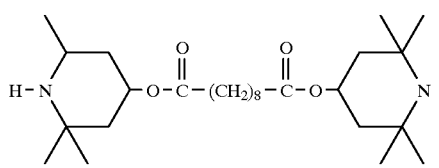

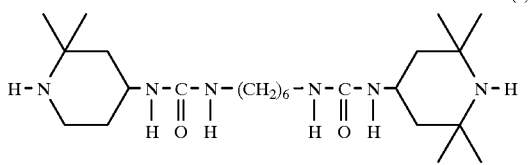
(c)

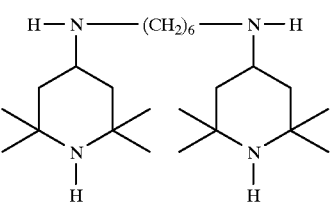
(d)

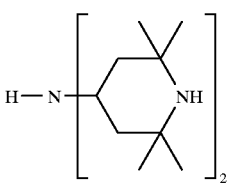
(e)

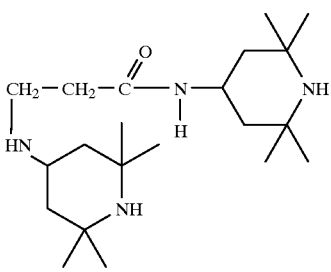
(f)

A polymeric 2,2,4-trimethyldihydroquinoline may also be reacted with prepolymer. Preferably, the molecular weight of the polymer is about 600 to 1200. A preferred example of this polymer has the formula:

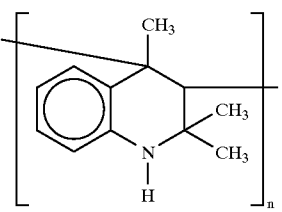

where n is 1, 2 or 3.

The novel moisture-crosslinking PU hot-melt adhesives preferably have a viscosity of $10^3$–$10^5$ mPa's at 100 to 150° C. The content of sterically hindered urea groups is preferably 0.5–2.5 mmol/g, prior to crosslinking with water.

The adhesive composition may be prepared as follows. Preferably, the prepolymer and polyamine are combined at a temperature where sterically hindered urea groups are not formed and then allowed to cool to temperatures where the polyamine reacts with the —NCO groups to form sterically hindered urea linkages. Preferably, the polyamine is added in portions, with intense stirring, to the NCO-containing prepolymer, which is heated at 100 to 150° C. After the end of addition of the polyamine, the preparation of the novel PU hot-melt adhesive is almost complete. Preferably, 0.6 to 1 sterically hindered amino groups react per NCO group. It has been found advantageous to add stabilizers to the mixture of NCO prepolymer and polyamine in order to keep the physical properties, especially the melt viscosity and the color, as constant as possible. For this purpose, at least one of the following substances may be used: phosphoric acid, phosphorus acid and toluenesulfonyl isocyanate. Preferably, the reaction mixture contains up to 0.5%, more preferably 0.01 to 0.1% of the stabilizer, based on the weight of the prepolymer.

For the curing reaction of the polyamine with the NCO prepolymer, i.e., formation of sterically hindered urea groups, no catalysts are necessary because the reaction takes place quickly during cooling. The subsequent crosslinking reaction with the water, on the other hand, may be accelerated using catalysts well-known in polyurethane chemistry, such as dibutyltin dilaurate (DBTL), for example. The amount of catalyst is may be 0 to 1.5%, preferably 0.5 to 1%, based on the weight of the prepolymer.

When the polyamine additionally contains two other functional groups, e.g., non-hindered amino groups as in compound (d), which can react with —NCO groups to produce a stable urea linkage at 100–150° C., it is preferably to use the following procedure when preparing adhesive composition. Prior to reaction with the prepolymer, the polyamine is reacted at 100 to 150° C. with a diisocyanate, preferably isophorone diisocyanate, such that 1–1.2 NCO groups react per additional functional group. In this reaction it has been found expedient to add 1 to 15%, preferably 3 to 10% of a hydrocarbon resin. The term "hydrocarbon resin" refers to petroleum resins, coal-tar resins and terpene resins. These resins preferably have a molecular weight of less than 2000. Preferred hydrocarbon resins include modified aromatic hydrocarbon resins, terpene resins such as α- and β-pinene polymers, low molecular mass polystyrenes (such as poly-a-methylstyrene), rosin esters and coumarone/indene resins. After the reaction of the additional functional groups of the polyamine with the NCO groups of the diisocyanate, the NCO prepolymer is added portionwise at 100–150° C.

The adhesive composition may be used immediately after combining the prepolymer and the polyamine. Two surfaces may be bonded by applying the adhesive composition to a first surface followed by contacting the first surface with a second surface. The adhesive may be applied using an applicator machine, preferably a hot-melt adhesive gun, in a thickness of 0.05–0.7 mm to the substrate which is to be bonded. The nature of the substrate is not particularly limited. The substrate may be wood, plastic or metal. Preferably, absorbent substrates are bonded.

After application to the substrate and subsequent cooling, the resulting adhesive bond has a high tensile shear strength. The high tensile shear strength may result from almost spontaneous formation a crosslinked polymer with very high molecular weight (theoretically infinite). In contract, conventional moisture-crosslinking PU hot-melt adhesive typically take 1–7 days to crosslink. Another important feature of the novel moisture-crosslinking PU hot-melt adhesives is that the thermally labile polymer formed at room temperature, and containing sterically hindered urea groups, undergoes conversion with $H_2O$ to form a stable, urea-functional thermoset polymer, accompanied by release of the sterically hindered amino groups. If this conversion to a stable thermoset polymer did not occur, the present adhesive would not have good bond strength at relatively high temperatures, because the sterically hindered urea groups are thermally labile.

In addition to the high initial strengths, the novel PU hot-melt adhesives based on (cyclo)aliphatic diisocyanates have a range of further advantages over the conventional, exclusively MDI-based PU hot-melt adhesives, such as improved storage stability and virtually no formation of allophanates at relatively high temperatures.

Without being limited to any theory, the —NCO prepolymer may be combined with the sterically hindered polyamine without reaction at temperatures between 100 to 150° C. because the following equilibrium:

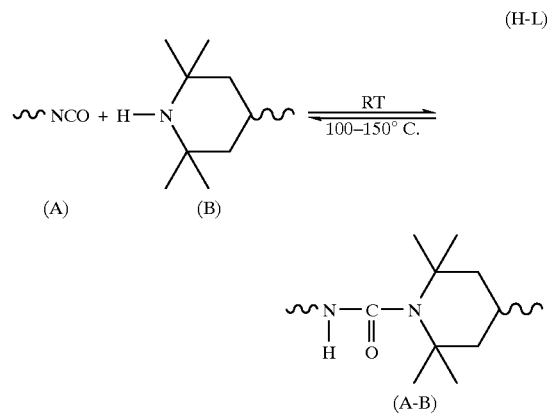

lies almost completely on the side of the starting components A and B in this temperature range, i.e., the amine groups do not react with the isocyanate groups. As the temperature falls, the equilibrium shifts more and more to the side of the reaction product A═B, i.e., the amine groups react with the —NCO groups of the prepolymer. At room temperature, the reaction product A═B is present exclusively.

Therefore, the adhesive bond has its highest initial strength when the composition reaches room temperature after being applied in melt form. At higher temperatures, this the adhesive bond breaks, because the urea groups formed in the reaction of A with B are thermally labile and diisociate into starting materials at elevated temperatures.

The sterically hindered urea group formed in the reaction of A with B is very sensitive to hydrolysis and may be converted by reaction with $H_2O$ into a thermally stable urea group H═ST) as shown below:

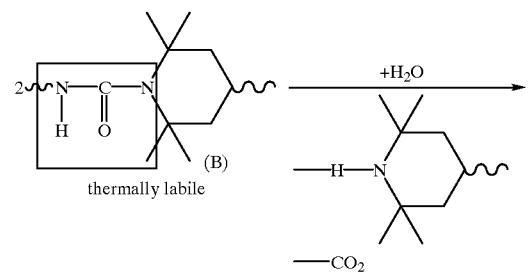

-continued

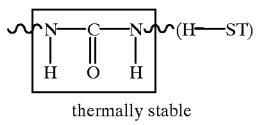

thermally stable

Through this conversion, the novel PU hot-melt adhesive is converted to a thermally stable polyurea. As a result, the adhesive bond also has high strength at elevated temperatures. The conversion to the thermoset urea polymer may take 1 to 7 days, similar to the conventional moisture-crosslinking PU hot-melt adhesives. Preferably, the initial tensile shear strength of the adhesive is 60 to 100% of the strength after the crosslinking reaction with water. The "initial tensile shear strength" refers to the adhesive strength when measured directly after the reaction components have been combined, applied to the substrate(s) and allowed to cool to room temperature, e.g., two hours after cooling. The shear strength is preferably measured using two wood substrates according to DIN 53 283, incorporated herein by reference.

Having generally described this invention, a further understanding can be obtained by reference to certain specific examples which are provided herein for purposes of illustration only and are not intended to be limiting unless otherwise specified.

EXAMPLES

A) Starting Materials

1. NCO prepolymers (A)

1.1 Trimeric hexamethylene diisocyanate having an NCO content of 22%

1.2 Trimeric isophorone diisocyanate having an NCO content of 17.3%

1.3 Reaction product of 7 NCO equivalents of trimeric isophorone diisocyanate (A) (1.2) and 1 mol of a polyesterdiol formed from adipic acid and hexanediol having a molar weight of 1000 and an NCO content of 7.4%.

2. Polyamines (B) containing sterically hindered amino groups

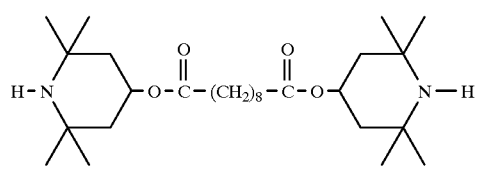

2.1

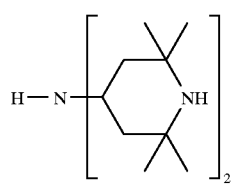

2.2

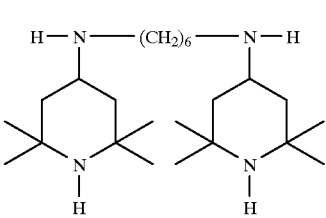

2.3

B) Preparation and Use of Moisture-Crosslinking PU Hot-Melt Adhesives

1. General Preparation

To the NCO prepolymer (A), heated at 100 to 150° C., the polyamine (B) containing sterically hindered amino groups is added in portions, with intense stirring, such that there is one equivalent of NH per NCO equivalent. After the polyamine has been added, the preparation of the novel moisture-crosslinking PU hot-melt adhesive, with a viscosity at 100 to 150° C. of $10^3$–$10^5$ mpa's, is at an end; it can be applied immediately using suitable apparatus.

If the polyamine A) 2.3 is employed to prepare the moisture-crosslinking PU hot-melt adhesive, this polyamine is reacted, prior to mixing with the NCO prepolymer, first with isophorone diisocyanate in a molar ratio of 1:1.1 (at 140–150° C.; only the two amino groups which are not sterically hindered react). This is followed, at 150° C., by mixing with the NCO prepolymer. The novel moisture-crosslinking PU hot-melt adhesives listed in the table below were prepared in accordance with this procedure.

2. Production of Adhesive Bonds

The wooden test specimens to be bonded were cleaned and were coated at about 60° C. with the novel moisture-crosslinking PU hot-melt adhesive. It was found advantageous to coat both of the surfaces to be bonded. Following the application of adhesive, the surfaces to be bonded were pressed together and fixed with a screw clamp. The tensile shear strength of these bonds was measured at room temperature and at 80° C. (DIN 53 283, incorporated herein by reference) after 2 h, 7 d and 90 d (Table 1).

Obviously, numerous modifications and variations of the present invention are possible in light of the above teachings. It is therefore to be understood that within the scope of the appended claims, the invention may be practised otherwise than as specifically described herein.

The present application is based on German Application No. 196 31 993.5, filed Aug. 8, 1996, and incorporated herein by reference in its entirety.

TABLE 1

Adhesive bonds produced with the H₂O-crosslinking PU hot-melt compositions

| Example No. | Composition of the PU hot-melt adhesive | | wood/wood bond Tensile shear strength N/mm² (DIN 53 283) | | | | | |
|---|---|---|---|---|---|---|---|---|
| | | sterically- | Room Temperature | | | 80° C. | | |
| B | NCO pre-polymer | hindered polyamine | after: 2 h | 70 d | 90 d | after: 2 h | 7 d | 90 d |
| 2.1 | A.1.1 | A.2.2 | 8 | 11 | 12 | <0.1 | 4 | 5 |
| 2.2 | A.1.2 | A.2.2 | <0.1 comes apart | | | | | |
| 2.3 | A.1.3 | A.2.3 | 7 | 8 | 8 | comes apart | 3 | 4 |
| 2.4 | A.1.3 | | comes apart | 5 | 7 | comes apart | 2 | 2 |
| 2.5 | A.1.3 | A.2.1 | 10 | 11 | 11 | comes apart | 4 | 3 |
| 2.6 (comparison) | H₂O-cross-linking (standard) | PU hot-melt adhesive | <0.1 | 10 | 10 | comes apart | 3 | 4 |

What is claimed as new and is desired to be secured by Letters Patent of the United States is:

1. An adhesive composition produced by a process comprising reacting:

a prepolymer having terminal —NCO groups and an NCO content of 1 to 23% with either (A) a polyamine having at least two amino groups having the formula:

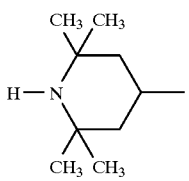

or (B) a polyamine having the formula:

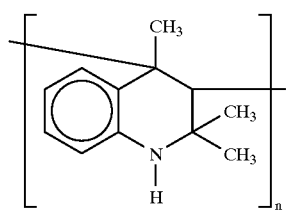

wherein n is an integer from 3 to 6, wherein the adhesive composition has the property of being able to bond two surfaces to each other upon cross-linking with moisture, and wherein —NCO groups of the prepolymer react with the polyamine to form sterically hindered urea linkages.

2. The composition of claim 1, wherein the prepolymer is produced by a process comprising reacting an diisocyanate of the formula:

OCN—R—NCO, wherein R is a hydrocarbon radical, with a polyol.

3. The composition of claim 2, wherein

R is a C₆–C₁₄ aliphatic, cycloaliphatic, (cyclo)aliphatic or aromatic radical;

the polyol has a molecular weight of 62 to 4000; and the NCO:OH ratio is 2:1.

4. The composition of claim 1, wherein the prepolymer has the formula:

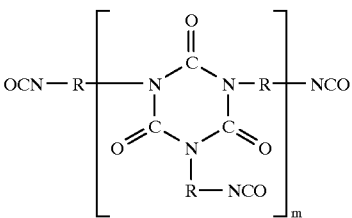

wherein

R is a hydrocarbon radical; and m is an integer from 1 to 3.

5. The composition of claim 4, wherein R is a C₆–C₁₄ aliphatic, cycloaliphatic, (cyclo)aliphatic or aromatic radical.

6. The composition of claim 1, wherein the prepolymer is obtained by reacting an isocyanurate having the formula:

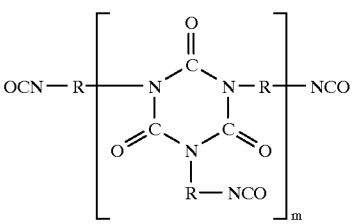

wherein

R is a hydrocarbon radical; and m is an integer from 1 to 3, with a polyol.

7. The composition of claim 6, wherein

R is a C₆–C₁₄ aliphatic, cycloaliphatic, (cyclo)aliphatic or aromatic radical;

the polyol has a molecular weight of 62 to 4000; and the NCO:OH ratio is 2:1.

8. The composition of claim 1, wherein the prepolymer has the formula:

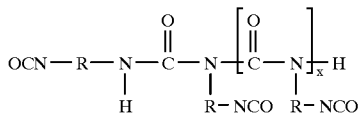

wherein

R is a hydrocarbon radical; and x is an integer from 1 to 3.

9. The composition of claim 1, wherein the prepolymer is obtained by reacting a biuret having the formula:

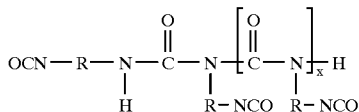

wherein

R is a hydrocarbon radical; and x is an integer from 1 to 3, with a polyol.

10. The composition of claim 8, wherein R is a $C_6$–$C_{14}$ aliphatic, cycloaliphatic, (cyclo)aliphatic or aromatic radical.

11. The composition of claim 9, wherein

R is a $C_6$–$C_{14}$ aliphatic, cycloaliphatic, (cyclo)aliphatic or aromatic radical;

the polyol has a molecular weight of 62 to 4000; and the NCO:OH ratio is 2:1.

12. The composition of claim 1, wherein the prepolymer is produced by a process comprising reacting 2 moles of an isocyanurate having the formula:

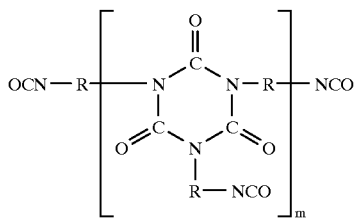

wherein

R is a hydrocarbon radical; and m is an integer from 1 to 3, with 1 mole of a polyesterdiol.

13. The composition of claim 12, wherein R is a $C_6$–$C_{14}$ aliphatic, cycloaliphatic, (cyclo)aliphatic or aromatic radical and the polyesterdiol has a molecular weight of 400 to 2000.

14. The composition of claim 13, wherein the polyesterdiol has a molecular weight of 400 to 1000.

15. The composition of claim 1, wherein the polyamine (A) has the formula:

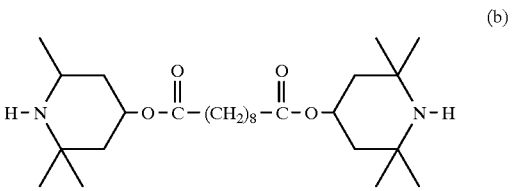

(b)

16. The composition of claim 1, wherein the polyamine (A) has the formula:

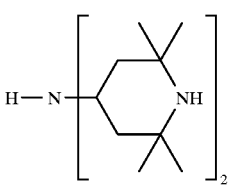

17. The composition of claim 1, wherein the polyamine (A) has the formula:

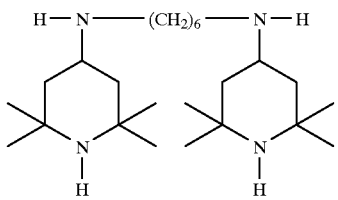

18. The composition of claim 1, wherein the prepolymer and the polyamine are combined at 100 to 150° C. and then cooled to room temperature.

19. The composition of claim 1, wherein 0.6 to 1 sterically hindered amino group reacts per NCO group.

20. A bonded composition, prepared by a process comprising applying the adhesive composition of claim 1 to a first surface followed by contacting the first surface with a second surface.

21. A method of preparing an adhesive composition, comprising reacting a prepolymer having terminal —NCO and an NCO content of 1 to 23% with either (A) a polyamine having at least two amino groups having the formula:

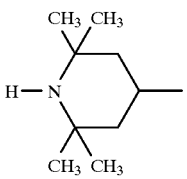

or (B) a polyamine having the formula:

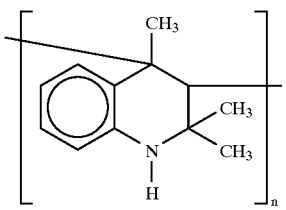

wherein n is an integer from 3 to 6, wherein the adhesive composition has the property of being able to bond two surfaces to each other upon cross-linking with moisture, and wherein —NCO groups of the prepolymer react with the polyamine to form sterically hindered urea linkages.

22. The method of claim 21, wherein the prepolymer and the polyamine are combined at 100 to 150° C. and then cooled to room temperature.

23. The method of claim 21, wherein the polyamine (A) is prepared by a process comprising reacting an amine having the formula:

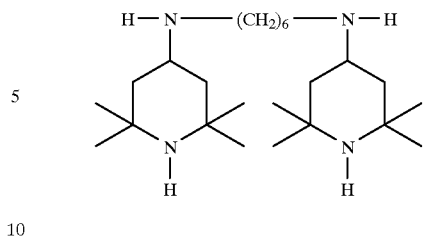

with a diisocyanate.

24. The method of claim 23, wherein the diisocyanate is isophorone diisocyanate.

25. The method of claim 23, wherein the reaction mixture of the amine and the diisocyanate further comprises a hydrocarbon resin.

26. A method of bonding two surfaces, comprising applying the adhesive composition of claim 1 to a first surface followed by contacting the first surface with a second surface.

* * * * *